United States Patent [19]
Selby

[11] Patent Number: 5,518,319
[45] Date of Patent: May 21, 1996

[54] NON-LINEAR HYDRODYNAMIC BEARING

[76] Inventor: Theodore W. Selby, 4402 Arbor Dr., Midland, Mich. 48640

[21] Appl. No.: 486,899

[22] Filed: Jun. 7, 1995

[51] Int. Cl.⁶ .................................................. F16C 32/06
[52] U.S. Cl. ........................ 384/100; 384/108; 384/110; 384/114; 384/119
[58] Field of Search .................................. 384/100, 114, 384/119, 120, 108, 109, 107

[56] References Cited

U.S. PATENT DOCUMENTS

| | | | |
|---|---|---|---|
| 3,256,451 | 6/1966 | Shipman | 384/100 X |
| 3,265,452 | 8/1966 | Pan et al. | 384/110 X |
| 3,447,841 | 6/1969 | Fernlund | 384/109 |
| 3,484,143 | 12/1969 | Tallian et al. | 384/110 X |

FOREIGN PATENT DOCUMENTS

| | | | |
|---|---|---|---|
| 37116 | 3/1982 | Japan | 384/100 |
| 49119 | 3/1985 | Japan | 384/109 |

OTHER PUBLICATIONS

Obert "Internal Combustion Engines and Air Pollution," Harper & Row Publishers, New York, 1973, pp. 633–639.

*Primary Examiner*—Thomas R. Hannon
*Attorney, Agent, or Firm*—Christopher John Rudy

[57] ABSTRACT

Non-axially-cylindrical journal and bearing assembly operates with hydrodynamic lubrication and has high load capability.

12 Claims, 1 Drawing Sheet

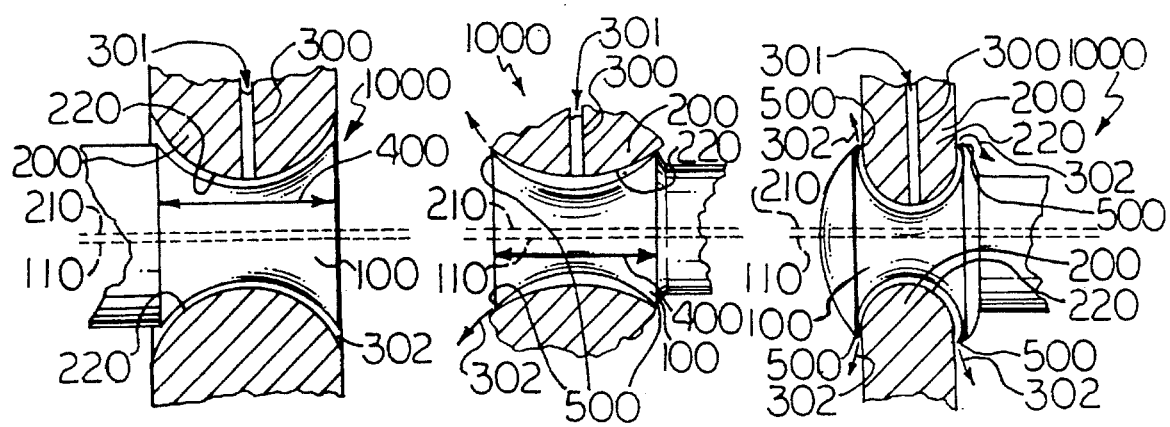
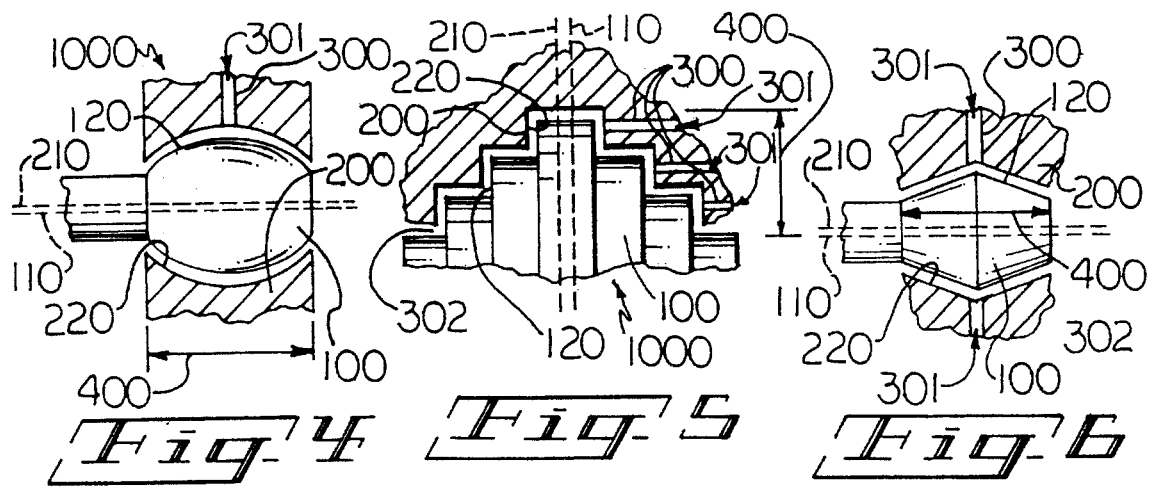
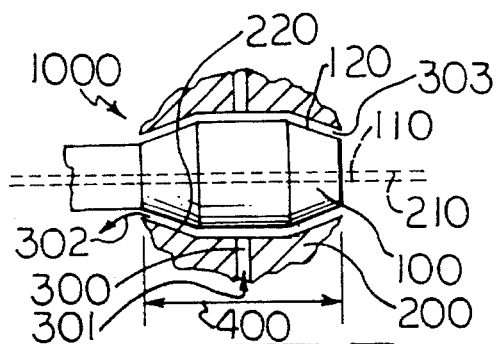
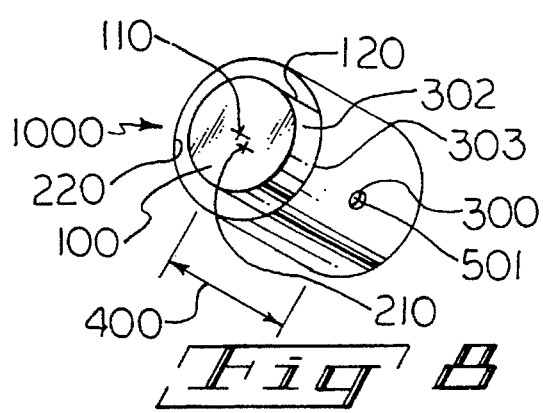

NON-LINEAR HYDRODYNAMIC BEARING

FIELD

The present invention concerns a journal and/or bearing, useful in machinery and providing hydrodynamic lubrication.

BACKGROUND

Lubricated axially-cylindrical journals and their bearings are well-known and widely used. In such devices, an axially-cylindrical shaft, called the journal, is positioned within a mating cylindrical journal bearing. When the journal is at rest, its weight allows line contact of the shaft and bearing. In use, between the shaft and bearing, a film of oil lubricates the device, typically so that with speed increase full-film or full hydrodynamic lubrication is generated as a consequence of the interaction of the viscosity of the oil, the speed of the journal, and the load applied normal to the journal. This interaction enables the device to rotate at lessened levels of friction as a consequence of what is technically called 'hydrodynamic lubrication'. Thus, engines run smoothly with only minor amounts of wear since the journal and bearing do not touch directly but are separated by the lubricant. See e.g., Obert, "Internal Combustion Engines and Air Pollution," Harper & Row Publishers, New York (1973) at pages 633-6.

One limitation in such devices, however, is the weight the journal will support. To carry a large load as, for example, in crankshafts and camshafts of larger engines, the length of the cylindrical journal in general registry with its accompanying bearing must be substantial. Accordingly, much more weight and engine length is necessitated.

It would be desirable to have lighter engines and motors so that more power can be transformed into external work, and so that mobility in general might be enhanced.

SUMMARY

The invention provides a non-axially-cylindrical journal/bearing assembly comprising a journal having a central axis of rotation and a bearing surface which is radially symmetrical to the central axis of rotation but which is non-cylindrical in relation thereto; a journal bearing having a generally corresponding bearing surface which is also non-cylindrical and in at least partial, general registry to the bearing surface of the journal, and a means for fluidly lubricating, such that hydrodynamic lubrication of the assembly can be encountered during operation. The invention also provides for a 'pinched' hydrodynamic bearing lubricated assembly. Accordingly as well, the journal and the journal bearing themselves are provided.

The invention is useful in machinery operation.

Significantly by the invention, non-axially cylindrical hydrodynamic bearing assemblies can provide for engines and motors which are lighter in weight than known, corresponding engines and motors with axially-cylindrical journals and journal bearings. Yet, they can carry as much or more load than the corresponding engines and motors. They can be efficient and long-lasting.

Numerous further advantages attend the invention.

DRAWINGS

The drawings form part of the specification hereof. In the drawings, in which like numerals refer to like features, the following is briefly noted:

FIG. 1 is a cut away, side view of a non-linear hydrodynamic bearing assembly of the invention, with a convex journal and a concave journal bearing.

FIG. 2 is a cut away, side view of a non-linear hydrodynamic bearing assembly of the invention, with a convex journal and pinched, concave journal bearing.

FIG. 3 is a cut away, side view of a non-linear hydrodynamic bearing assembly of the invention, with a steeply convex journal and pinched, concave journal bearing.

FIG. 4 is a cut away, side view of a non-linear hydrodynamic bearing assembly of the invention, with a concave journal and a convex journal bearing.

FIG. 5 is a cut away, side view of a non-linear hydrodynamic bearing assembly of the invention, a stepped journal and corresponding journal bearing.

FIG. 6 is a cut away, side view of a non-linear hydrodynamic bearing assembly of the invention, with a convex, V-shaped journal and concave, V-shaped journal bearing.

FIG. 7 is a cut away, side view of a non-linear hydrodynamic bearing assembly of the invention, with a convex, flattened-V-shaped journal and a concave flattened-V-shaped journal bearing.

FIG. 8 is a front, perspective view of a non-linear hydrodynamic bearing assembly of the invention.

ILLUSTRATIVE DETAIL

The invention can be further understood by reference to the present detail and drawings, which are to be construed as illustrative and not necessarily limiting in nature.

In general reference to the figures, non-linear hydrodynamic bearing assembly 1000 has journal 100 with central axis of rotation 110 and bearing surface 120 which is radially symmetrical to the central axis of rotation but which is non-cylindrical in relation thereto. The assembly 1000 also has journal bearing 200 with central bearing axis 210 and bearing surface 220 which generally corresponds to the journal bearing surface 120. Also, the journal bearing surface 220 is non-cylindrical and is in at least partial, general registry to the journal bearing surface 120. The assembly 1000 has means for fluidly lubricating 300 it, for example, as provided by lubricating fluid entry port 301 and lubricating fluid exit 302, through which lubricating fluid 303 such as water or oil, preferably motor oil, such that hydrodynamic lubrication of the assembly can be encountered during operation.

Clearances in assembly 1000 between the journal 100 and journal bearing 200 can be about those known in the art for standard, cylindrical journals and bearings. Clearances may be more or less, however, especially in the range of 150 to 300 micro inches.

Linear length 400 can be less in the assembly of the invention than in known axially-cylindrical journals and bearings. This can be attributed to the increased lengths 121 & 221 along non-cylindrical surfaces 120 & 220.

The assembly 1000 may have constricted space 500 formed by journal 100 and/or journal bearing 200 so as to create a pinched lubricant outlet formation, for example, about the exit 302 to retard the escape of the lubricant under the journal loads. Such a pinched space may increase further hydrodynamic pressure so as to increase the load carrying capability of the assembly.

The assembly and its parts can be made by known methods. Thus, computer-assisted grinding and polishing of cast or forged metals or engineering plastics, especially metals such as steel, brass, aluminum, and so forth, can be employed to make the assembly of the invention.

CONCLUSION

The present invention is thus provided. Numerous modifications can be effected within its spirit, the literal claim scope of which is particularly pointed out as follows:

I claim:

1. A non-linear hydrodynamic bearing assembly comprising a rotatable journal having a central axis of rotation in relation to the journal and a surface for matching with a bearing surface of a journal bearing, which is radially symmetrical to the central axis of rotation but which is non-cylindrical in relation thereto; the journal bearing, which has a generally corresponding bearing surface, and which is also non-cylindrical, and in at least partial, general registry to the bearing surface of the journal; and a means for fluidly lubricating with a lubricant of sufficient viscosity to cause hydrodynamic lubrication, such that when the journal is at rest, its weight allows contact of said surfaces as defined by a function intersecting a plane which intersects the central axis of rotation of the journal and intersects said surfaces on at least one point of said surfaces when in contact, and, when the assembly is in use, between said surfaces a film of the lubricant lubricates said surfaces so that with rotational speed increase of the journal hydrodynamic lubrication of the assembly can be generated as a consequence of interaction of the lubricant and its viscosity, the rotational speed of the journal, and a load applied to the journal during operation, said surfaces no longer in contact with each other but separated by the lubricant, wherein the journal, as part of a hydrodynamic bearing assembly rotates with its central axis of rotation noncoincident with an imaginary center of the journal bearing.

2. The assembly of claim 1, which is adapted for lubrication by an oil.

3. The assembly of claim 1, which has a convex journal and a concave journal bearing.

4. The assembly of claim 1, which has a concave journal and a convex journal bearing.

5. The assembly of claim 1, which has a stepped journal and journal bearing.

6. A pinched hydrodynamic bearing assembly comprising a journal having a central axis of rotation and a bearing surface which is radially symmetrical to the central axis of rotation; a journal bearing having a generally corresponding bearing surface which is in at least partial, general registry to the bearing surface of the journal; a means for fluidly lubricating, and a constricted space formed by at least one of the journal and the journal bearing so as to create a pinched formation so as to increase hydrodynamic pressure so as to increase the load carrying capability of the assembly, such that hydrodynamic lubrication of the assembly can be encountered during operation.

7. The assembly of claim 6, which is adapted for lubrication by an oil.

8. A non-linear hydrodynamic bearing assembly comprising a journal having a central axis of rotation and a bearing surface which is radially symmetrical to the central axis of rotation but which is non-cylindrical in relation thereto; a journal bearing having a generally corresponding bearing surface which is also non-cylindrical and in at least partial, general registry to the bearing surface of the journal, and a means for fluidly lubricating such that hydrodynamic lubrication of the assembly can be generated during operation, which assembly has a constricted space formed by at least one of the journal and the journal bearing so as to create a pinched formation so as to increase hydrodynamic pressure so as to increase the load carrying capability of the assembly.

9. The assembly of claim 8, which is adapted for lubrication by an oil.

10. The assembly of claim 8, which has a convex journal and a concave journal bearing.

11. The assembly of claim 8, which has a concave journal and a convex journal bearing.

12. The assembly of claim 8, which has a stepped journal and journal bearing.

* * * * *